United States Patent
Bauer

(10) Patent No.: US 8,810,905 B2
(45) Date of Patent: Aug. 19, 2014

(54) STEREOMICROSCOPE FLUORESCENCE SYSTEM

(76) Inventor: Kenneth W. Bauer, Carlsbad, CA (US)

(*) Notice: Subject to any disclaimer, the term of this patent is extended or adjusted under 35 U.S.C. 154(b) by 217 days.

(21) Appl. No.: 13/360,948

(22) Filed: Jan. 30, 2012

(65) Prior Publication Data
US 2013/0194661 A1     Aug. 1, 2013

(51) Int. Cl.
*G02B 21/22*     (2006.01)
*G02B 21/06*     (2006.01)

(52) U.S. Cl.
USPC .......................................... 359/376; 359/385

(58) Field of Classification Search
USPC ........................................ 359/374–376, 385
See application file for complete search history.

(56) References Cited

U.S. PATENT DOCUMENTS

| | | | |
|---|---|---|---|
| 5,706,128 A | 1/1998 | Greenberg | |
| 6,040,940 A * | 3/2000 | Kawasaki | 359/389 |
| 6,822,790 B2 | 11/2004 | Knoblich | |
| 7,113,330 B2 * | 9/2006 | Kaneda | 359/388 |
| 7,649,685 B2 * | 1/2010 | Spink | 359/385 |
| 8,000,003 B2 * | 8/2011 | Fey | 359/368 |
| 2011/0270092 A1 | 11/2011 | Kang | |
| 2012/0057226 A1 * | 3/2012 | Kuster | 359/376 |
| 2012/0326055 A1 * | 12/2012 | Wilson et al. | 250/459.1 |

* cited by examiner

*Primary Examiner* — Frank Font
(74) *Attorney, Agent, or Firm* — Eric Karich

(57) ABSTRACT

A stereomicroscope fluorescence system has a light source, a light guide, a focusing lens assembly, a stereomicroscope with two eyepiece receivers, and two eyepiece assemblies. The light guide is operably attached to receive light from the light source to transmit the light to the focusing lens assembly. The focusing lens assembly includes an excitation filter coated on the focusing lens. The eyepiece assemblies each have a barrier filter and are adapted to be mounted on the eyepiece receivers.

7 Claims, 2 Drawing Sheets

STEREOMICROSCOPE FLUORESCENCE SYSTEM

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to microscopes, and more particularly to stereomicroscope fluorescence system that enables a user to perform fluorescence microscopy using a standard stereomicroscope.

2. Description of Related Art

The prior art teaches various fluorescence microscopes and systems. The following art defines the present state of this field:

Kawasaki, U.S. Pat. No. 6,040,940, teaches a reflective fluorescence microscope that includes a stereomicroscope and a reflecting fluorescence illumination optical system that is positioned outside of the stereomicroscope, illustrated in FIGS. 2 and 8. An excitation filter is positioned between the light guide and the illumination lens. An absorption filter is positioned between the zoom lenses and the imaging lenses.

Kaneda, U.S. Pat. No. 7,113,330, teaches a stereomicroscope that includes a fluorescent optical system. The fluorescent optical system includes a light guide that is positioned outside of the microscope housing. The stereomicroscope includes an excitation filter and an absorption filter.

Kang, U.S. 2011/0270092, teaches a fluorescence imaging system that includes a plurality of lights sources (coherent and non-coherent light) configured to irradiate light onto an object through a common light guide that is positioned outside of an optical imaging unit. A blocking filter mounted is on the optical imaging unit.

Knoblich, U.S. Pat. No. 6,822,790, teaches a lighting system for a stereomicroscope that includes two illumination channels arranged on a plane that is orthogonal with respect to the plane of the two observation channels. The two light channels are positioned within the housing of the microscope but outside of the observation beam paths. Suitable light sources include halogen cold-light sources, XBO lamps (xenon high pressure lamps), and HBO (mercury) lamps. This patent is also a good illustration of standard filters, that include filter holders for receiving filters, such as filter holder FAA (in FIG. 5) for receiving excitation filter A.

SUMMARY OF THE INVENTION

The present invention teaches certain benefits in construction and use which give rise to the objectives described below.

The present invention provides a stereomicroscope fluorescence system having a light source, a light guide, a focusing lens assembly, a stereomicroscope with two eyepiece receivers, and two eyepiece assemblies. The light guide is operably attached to receive light from the light source to transmit the light to the focusing lens assembly. In one embodiment, the focusing lens assembly includes an excitation filter coated on the focusing lens. In one embodiment the eyepiece assemblies each have a barrier filter and are adapted to be mounted on the eyepiece receivers.

A primary objective of the present invention is to provide a stereomicroscope fluorescence system that may be used to adapt a standard stereomicroscope for fluorescence microscopy using simple and easily interchanged components.

Another objective, in one embodiment, is to provide a stereomicroscope fluorescence system that includes a focusing lens assembly that includes an excitation filter coated on the focusing lens.

Another objective, in one embodiment, is to provide a stereomicroscope fluorescence system that includes eyepiece assemblies that each include a barrier filter.

Another objective is to provide a stereomicroscope fluorescence system that is able to switch between different fluorescence protocols by simply interchanging the focusing lens assembly (and/or light guide) to select components with suitable filters.

A further objective is to provide a stereomicroscope fluorescence system that is inexpensive to purchase and easy to use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a stereomicroscope fluorescence system 10 that enables a user to perform fluorescence microscopy using a standard stereomicroscope 14.

Figure 1:
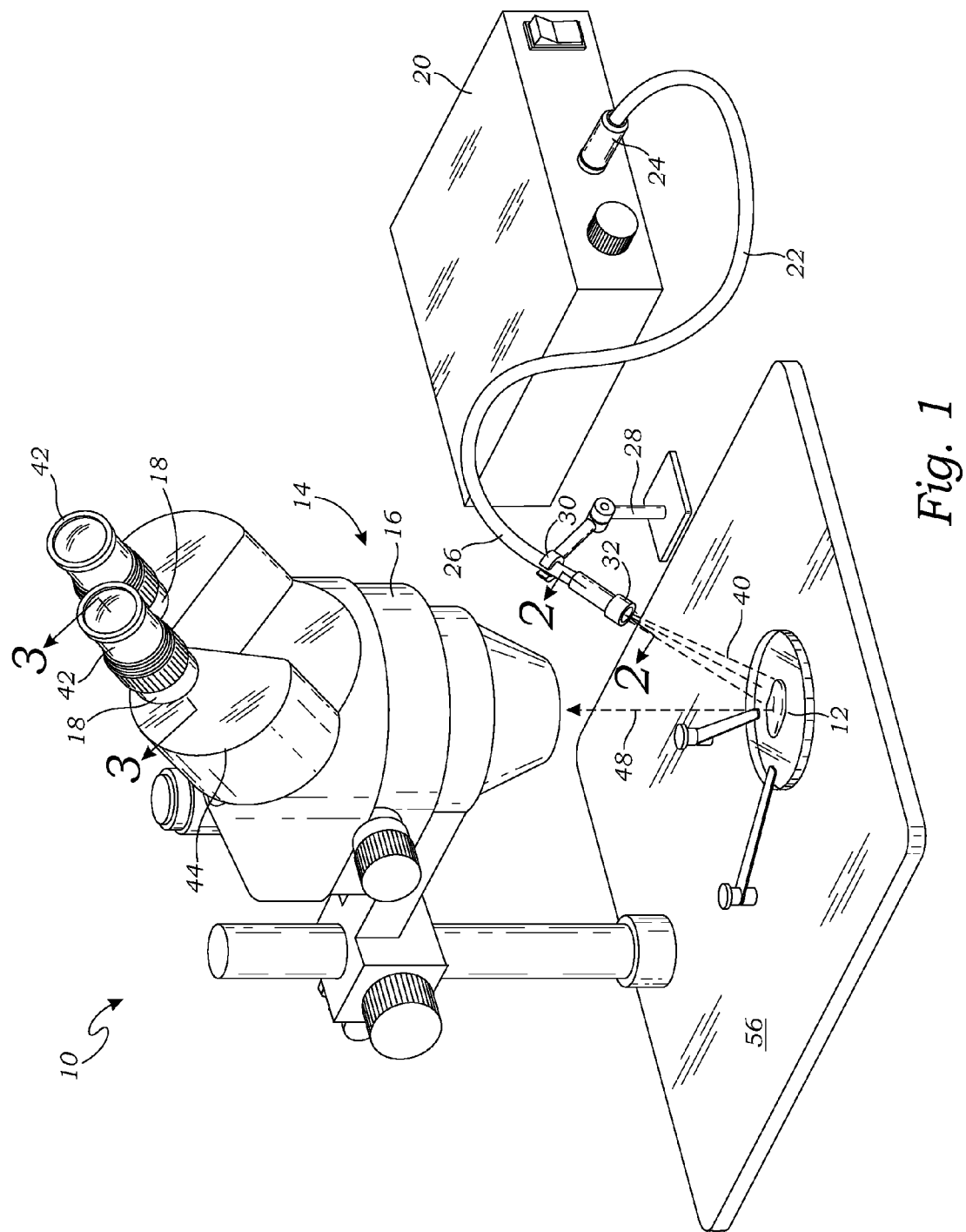
FIG. 1 is a perspective view of a stereomicroscope fluorescence system according to one embodiment of the present invention.

FIG. 1 is a perspective view of the stereomicroscope fluorescence system 10 according to one embodiment of the present invention. As shown in FIG. 1, the stereomicroscope fluorescence system 10 includes a light source 20, a light guide 22, a focusing lens assembly 32 mounted on the end of the light guide 22, and two eyepiece assemblies 42.

As illustrated in FIG. 1, the light source 20 may be any suitable light source (e.g., high-intensity metal halide, xenon, or any equivalent source known to those skilled in the art). The light source 20 may be operably attached to a first end 24 of the light guide 22 to direct light from the light source 20 through the light guide 22 to a sample 12. In the current embodiment, the light guide 22 may be a 5 mm liquid core light guide, which is well suited to transmit the light (e.g., UV, visible, or other suitable light wavelengths). However, alternative forms of light guides 22 may be utilized by one skilled in the art.

A second end 26 of the light guide 22 may include a focusing lens assembly 32 for directing excitation light 40 onto the sample 12, and two eyepiece assemblies 42 for filtering fluorescent light 48 from the sample 12. The focusing lens 36 and the eyepiece assemblies 42 are described in greater detail below.

In the embodiment of FIG. 1, a mounting device 28 is attached to the second end 26 of the light guide 22 with an attachment element 30 (e.g., a clamping feature) for positioning the focusing lens 36 to direct the excitation light 40 onto the sample 12. While one embodiment of the mounting device 28 is illustrated herein, alternative forms of mounting devices may be devised by those skilled in the art, and such alternatives should be considered within the scope of the present invention.

Figure 2:
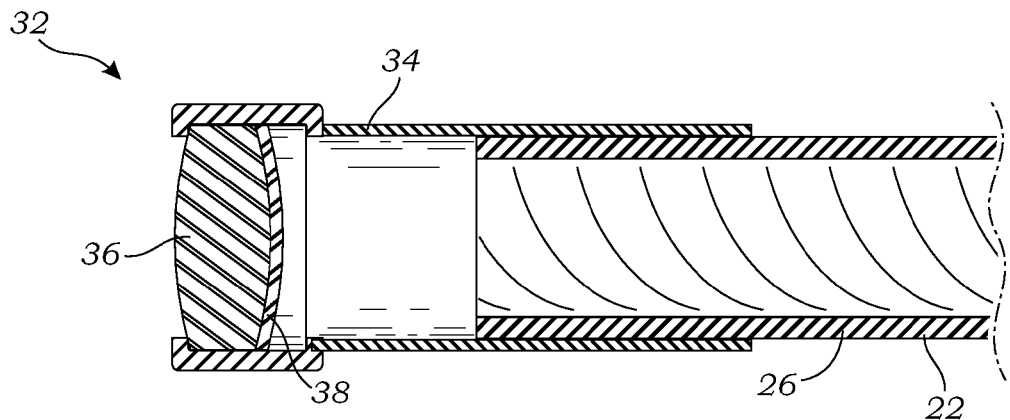
FIG. 2 is a sectional view of a focusing lens assembly of the stereomicroscope fluorescence system taken along line 2-2 in FIG. 1.

FIG. 2 is a sectional view of the focusing lens assembly 32 of the stereomicroscope fluorescence system 10 of FIG. 1. The focusing lens assembly 32 is attached to the second end 26 of the liquid light guide 22 and may contain a focusing lens housing 34 containing a focusing lens 36 and an excitation filter 38. Those skilled in the art may design many embodiments of the focusing lens assembly 32, and alternative embodiments should be considered within the scope of the present invention.

In the embodiment of FIG. 2, the excitation filter 38 is a coating that has been applied on the focusing lens 36 to filter out unwanted wavelengths of light, so that only the excitation light 40 (of selected wavelength) passes through the focusing lens assembly 32. In alternative embodiments, the excitation filter 38 may be provided in a different form, and/or otherwise mounted between the light source 20 and the sample 12.

Figure 3:
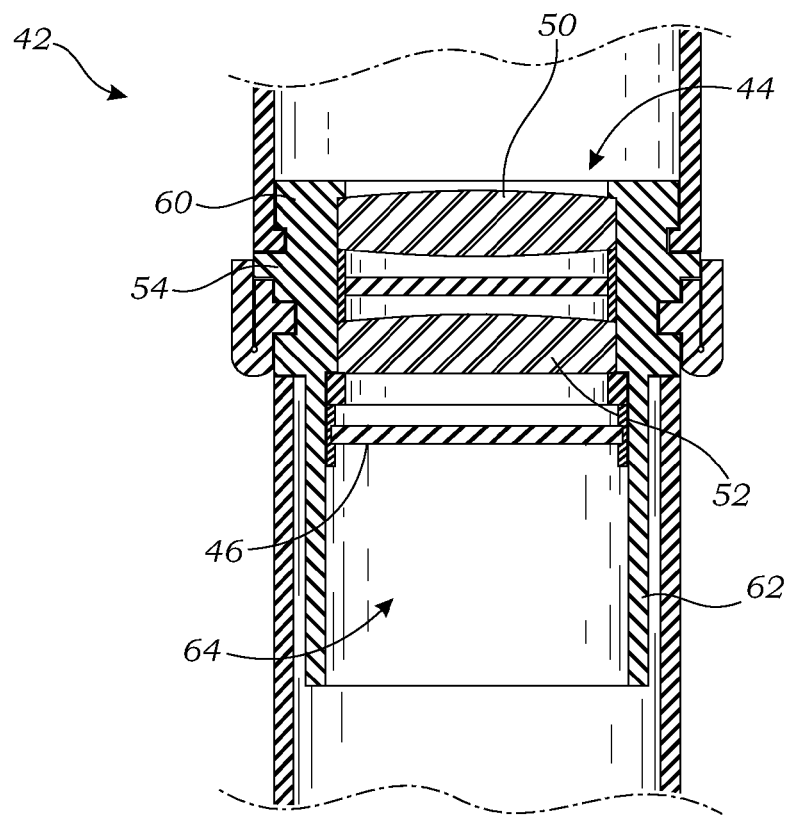
FIG. 3 is a sectional view of an eyepiece of the stereomicroscope fluorescence system taken along line 3-3 in FIG. 1.

FIG. 3 is a sectional view of the eyepiece assembly 42 of the stereomicroscope fluorescence system 10. As illustrated in FIG. 3, the eyepiece assembly 42 may include a housing 54 that contains at least one eyepiece lens 44 and a barrier filter 46.

In the embodiment of FIG. 3, at least one eyepiece lens 44 includes a first lens 50 and a second lens 52; however, any arrangement of lenses known to those skilled in the art may be used. The barrier filter 46 is also operably mounted within the housing 54 on the same optical path as the at first and second lenses 50 and 52. The barrier filter 46 isolates the fluorescent light 48 from the sample 12 and allows only this wavelength of light to pass through the eyepiece assembly 42. The barrier filter 46 prevents light other than the fluorescent light 48 from the sample from reaching the eye of an observer. As a result, only the fluorescent light 48 emitted from the sample 12 is viewed through the eyepiece assembly 42.

As illustrated in FIG. 3, the housing 54 is shaped for operably mounting the eyepiece assembly 42 on one of the eyepiece receivers 18 of the stereomicroscope 14. The eyepiece assembly 42 may be installed in the eyepiece receivers 18 by means of interlocking components such as are known in the art, or any other means of mounting known in the art (e.g., threadedly, frictionally, or in any other manner known to those skilled in the art). The housing 54 may have a first end 60 and a second end 62. The first end 60 of the housing 54 may hold the lenses 50 and 52. The second end 62 defines an internal chamber 64 that is shaped for removably receiving the barrier filter 46, such that the barrier filter 46 is positioned on the same optical path as the eyepiece lens 44.

FIGS. 1-3 illustrate the method of use of the stereomicroscope fluorescence system 10 described above. The user first selects which fluorescence method is most suitable to one's process of inquiry. The method of fluorescence will then determine which focusing lens assembly 32 should be utilized, and which eyepiece assemblies 42 should be used (i.e., which include the suitable filters utilized in the selected method).

The light guide 22, with the selected focusing lens assembly 32, may then be attached to the mounting device 28 with the attachment element 30 for positioning the focusing lens 36 to direct the excitation light 40 onto the sample 12. Using techniques well known in the art, the sample 12 is treated with fluorescent material and placed on a sample stage 56. The excitation light 40 illuminates the sample 12 and causes the sample 12 to emit the fluorescent light 48.

The resulting fluorescent light 48 enters the stereomicroscope body 16 and exits the eyepiece assemblies 42. The barrier filters 46 of the eyepiece assemblies 42 block unwanted wavelengths of light and prevent them from reaching the eye of the observer. Therefore, in looking through the eyepiece assembly 42, the observer can readily view characteristics of the sample 12 via the fluorescent light 48.

If another fluorescent method is selected, the excitation filter 38 and the barrier filters 46 may be exchanged with other filters, by quickly and easily exchanging the components as described above. The barrier filters 46 and the excitation filter 38 may be selected for use with standard fluorescence protocols, such as for fluorescein isothiocyanate (FITC), tetramethyl rhodamine iso-thiocynate (TRITC), or other protocols known in the art. The user is able to switch between different fluorescence protocols by simply interchanging the focusing lens assembly 32 (and/or light guide 22) to select components with suitable filters. The overall stereomicroscope fluorescence system 10 can be added to any existing stereomicroscope 14, therefore reducing cost and simplifying the entire method of generating fluorescent light.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A stereomicroscope fluorescence system for use with a stereomicroscope having two eyepiece receivers for viewing a sample, the stereomicroscope fluorescence system comprising:
   a light source;
   an excitation filter adapted to be operably mounted between the light source and the sample;
   a light guide operably attached to receive light from the light source; and
   two eyepiece assemblies, each adapted to engage one of the two eyepiece receivers of the stereomicroscope, each eyepiece assembly having at least one eyepiece lens and a barrier filter, the barrier filter being adapted to only allow the fluorescent light from the sample through the eyepiece assembly,
   wherein each of the eyepiece assemblies includes a housing that includes a first end and a second end, the second end defining an internal chamber shaped to removably receive the barrier filter so that the barrier filter is positioned on the same optical path as the at least one eyepiece lens.

2. A stereomicroscope fluorescence system for use with a stereomicroscope for viewing a sample, the stereomicroscope fluorescence system comprising:
   a light source;
   a light guide operably attached to receive light from the light source;

a focusing lens assembly operably attached to the light guide to emit light of the light guide through a focusing lens;

an excitation filter coated on the focusing lens to emit an excitation light from the focusing lens onto the sample, which emits a fluorescent light when exposed to the excitation light;

a barrier filter adapted to be operably mounted on the stereomicroscope to only allow the fluorescent light from the sample through the stereomicroscope.

3. The stereomicroscope fluorescence system of claim 2, further comprising a mounting device having an attachment element for attachment to a second end of the light guide for positioning the focusing lens to direct the excitation light onto the sample.

4. The stereomicroscope fluorescence system of claim 3, wherein the attachment element includes a clamping element for clamping the second end of the light guide.

5. A stereomicroscope fluorescence system for viewing a sample, the stereomicroscope fluorescence system comprising:

a light source;

a light guide operably attached to receive light from the light source;

a focusing lens assembly operably attached to the light guide to emit light of the light guide through a focusing lens;

an excitation filter coated on the focusing lens to emit an excitation light from the focusing lens onto the sample, which emits a fluorescent light when exposed to the excitation light;

a stereomicroscope having two eyepiece receivers;

two eyepiece assemblies, each adapted to engage one of the two eyepiece receivers, each eyepiece assembly having at least one eyepiece lens and a barrier filter, the barrier filter being adapted to only allow the fluorescent light from the sample through the eyepiece assembly.

6. The stereomicroscope fluorescence system of claim 5, wherein the excitation filter is coated on an inside surface of the focusing lens.

7. The stereomicroscope fluorescence system of claim 5, wherein each of the eyepiece assemblies includes a pair of eyepiece lenses, and wherein the barrier filter is positioned adjacent and optically aligned with the pair of eyepiece lenses.

* * * * *